(12) United States Patent
Mitchell et al.

(10) Patent No.: US 7,032,267 B2
(45) Date of Patent: Apr. 25, 2006

(54) DOCK LEVELER WITH COMBINATION SAFETY LEG AND LIP DEFLECTOR

(75) Inventors: Michael Mitchell, Milwaukee, WI (US); Timothy Muhl, Slinger, WI (US); Matthew Tourdot, Whitewater, WI (US); Reinhard E. Sander, Wauwatosa, WI (US); Norbert Hahn, Franklin, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 10/843,065

(22) Filed: May 11, 2004

(65) Prior Publication Data

US 2005/0251933 A1 Nov. 17, 2005

(51) Int. Cl.
*E01D 1/00* (2006.01)
(52) U.S. Cl. .......................................... 14/71.3; 14/71.1
(58) Field of Classification Search ................ 14/69.5, 14/71.1, 71.3
See application file for complete search history.

(56) References Cited

U.S. PATENT DOCUMENTS

| 3,061,855 A | 11/1962 | Layne |
| 3,081,470 A | 3/1963 | Feeley |
| 3,087,178 A | 4/1963 | Loomis |
| 3,117,332 A | 1/1964 | Kelley et al. |
| 3,137,017 A | 6/1964 | Pfleger et al. |
| 3,138,812 A | 6/1964 | Prosser |
| 3,175,238 A | 3/1965 | Pennington |
| 3,199,133 A | 8/1965 | Cramer |
| 3,235,896 A | 2/1966 | Riggs |
| 3,249,956 A | 5/1966 | Zajac et al. |
| 3,271,801 A | 9/1966 | Dieter et al. |
| 3,280,414 A | 10/1966 | Layne |
| 3,299,456 A | 1/1967 | Dieter et al. |
| 3,308,497 A | 3/1967 | Lambert |
| 3,323,158 A | 6/1967 | Loomis |
| 3,327,335 A | 6/1967 | Beckwith et al. |
| 3,368,229 A | 2/1968 | Pfleger |
| 3,409,922 A | 11/1968 | Beckwith et al. |
| 3,411,168 A | 11/1968 | Hecker, Jr. |
| 3,426,377 A | 2/1969 | Beckwith et al. |
| 3,444,574 A | 5/1969 | LeClear |
| 3,460,175 A | 8/1969 | Beckwith et al. |
| 3,475,778 A | 11/1969 | Merrick et al. |
| 3,486,181 A | 12/1969 | Hecker et al. |
| 3,497,893 A | 3/1970 | Beckwith et al. |

(Continued)

FOREIGN PATENT DOCUMENTS

CA 657714 2/1963

(Continued)

*Primary Examiner*—Gary S. Hartmann
(74) *Attorney, Agent, or Firm*—Hanley, Flight, & Zimmerman, LLC

(57) ABSTRACT

To permit below-dock level end-loading operations and to limit accidental freefalling of a dock leveler's deck, a dock leveler includes a unique support mechanism that employs one or more safety legs with an integral or operatively connected lip deflector. The support mechanism can be selectively moved to a deck-supporting position for freefall protection or moved to a lip-deflecting position for below dock level end-loading operations. In the deck-supporting position, the safety leg prevents the deck from falling an unsafe distance. In the lip-deflecting position, the lip deflector guides the descending motion of the dock leveler's lip extension plate so that the lip, while hanging pendant, can bypass and descend below a set of lip keepers.

33 Claims, 14 Drawing Sheets

U.S. PATENT DOCUMENTS

| | | |
|---|---|---|
| 3,500,486 A | 3/1970 | LeClear |
| 3,516,103 A | 6/1970 | Hecker, Jr. et al. |
| 3,530,488 A | 9/1970 | Beckwith |
| 3,553,756 A | 1/1971 | Hecker, Jr. et al. |
| 3,579,696 A | 5/1971 | Hecker, Jr. et al. |
| 3,583,014 A | 6/1971 | Brown et al. |
| 3,662,416 A | 5/1972 | Brooks et al. |
| 3,671,990 A | 6/1972 | Hovestad |
| 3,685,076 A | 8/1972 | Loblick |
| 3,699,601 A | 10/1972 | Hecker, Jr. et al. |
| 3,728,753 A | 4/1973 | Beckwith et al. |
| 3,763,514 A | 10/1973 | Bishop |
| 3,786,530 A | 1/1974 | Le Clear |
| 3,835,497 A | 9/1974 | Smith |
| 3,858,264 A | 1/1975 | Kuhns et al. |
| 3,877,102 A | 4/1975 | Artzberger |
| 3,902,213 A | 9/1975 | Pfleger et al. |
| 3,921,241 A | 11/1975 | Smith |
| 3,967,337 A | 7/1976 | Artzberger |
| 3,995,342 A | 12/1976 | Wiener |
| 4,010,505 A | 3/1977 | Bouman |
| 4,065,824 A | 1/1978 | Ellis et al. |
| 4,068,338 A | 1/1978 | Artzberger |
| 4,110,860 A | 9/1978 | Neff et al. |
| RE30,104 E | 10/1979 | Burnham |
| 4,257,137 A | 3/1981 | Hipp et al. |
| 4,279,050 A | 7/1981 | Abbott |
| 4,325,155 A | 4/1982 | Alten |
| 4,328,602 A | 5/1982 | Bennett |
| 4,364,137 A | 12/1982 | Hahn |
| 4,402,100 A | 9/1983 | Slusar |
| 4,531,248 A | 7/1985 | Swessel et al. |
| 4,570,277 A | 2/1986 | Hahn et al. |
| 4,619,008 A | 10/1986 | Kovach et al. |
| 4,662,021 A | 5/1987 | Hagen et al. |
| 4,776,052 A | 10/1988 | Delgado et al. |
| 4,819,770 A | 4/1989 | Hahn |
| 4,823,421 A | 4/1989 | Kleynjans et al. |
| 4,865,507 A | 9/1989 | Trickle |
| 4,920,598 A | 5/1990 | Hahn |
| 4,937,906 A | 7/1990 | Alexander |
| 4,944,062 A | 7/1990 | Walker |
| 4,974,276 A | 12/1990 | Alexander |
| 4,995,130 A | 2/1991 | Hahn et al. |
| 5,040,258 A | 8/1991 | Hahn et al. |
| 5,088,143 A | 2/1992 | Alexander |
| 5,123,135 A | 6/1992 | Cook et al. |
| 5,311,628 A | 5/1994 | Springer et al. |
| 5,323,503 A | 6/1994 | Springer |
| 5,416,941 A | 5/1995 | Hageman |
| 5,440,772 A | 8/1995 | Springer et al. |
| 5,475,888 A | 12/1995 | Massey |
| 5,526,545 A | 6/1996 | Alexander |
| 5,553,343 A | 9/1996 | Alexander |
| 5,560,063 A | 10/1996 | Alten et al. |
| 5,586,356 A | 12/1996 | Alexander |
| 5,640,733 A | 6/1997 | Alten et al. |
| 5,813,072 A | 9/1998 | Alexander |
| 6,085,375 A | 7/2000 | Holm |
| 6,216,303 B1 | 4/2001 | Massey |
| 6,276,016 B1 | 8/2001 | Springer |
| 6,487,741 B1 | 12/2002 | Alexander |
| 6,654,976 B1 * | 12/2003 | Digmann et al. ............ 14/69.5 |
| 6,918,151 B1 * | 7/2005 | Massey ..................... 14/69.5 |
| 6,931,686 B1 * | 8/2005 | Hoofard et al. ............. 14/69.5 |

FOREIGN PATENT DOCUMENTS

| | | |
|---|---|---|
| CA | 935606 | 10/1973 |
| DE | 28 00 128 | 7/1979 |
| EP | 0 130 393 | 1/1985 |
| FR | 2615177 | 6/1992 |
| GB | 1049759 | 11/1962 |
| GB | 1349801 | 4/1974 |
| GB | 2048210 | 12/1980 |

* cited by examiner

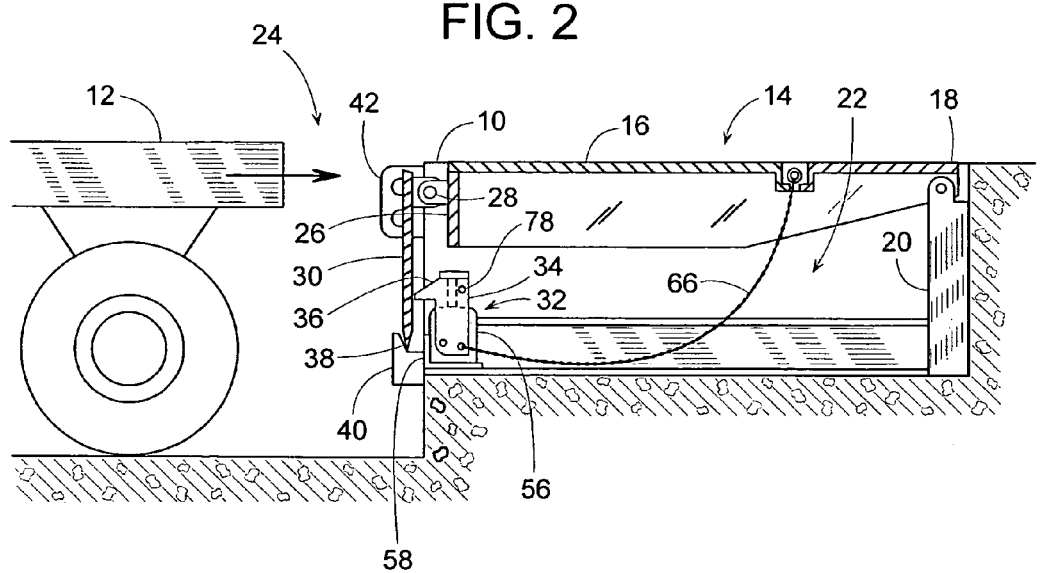
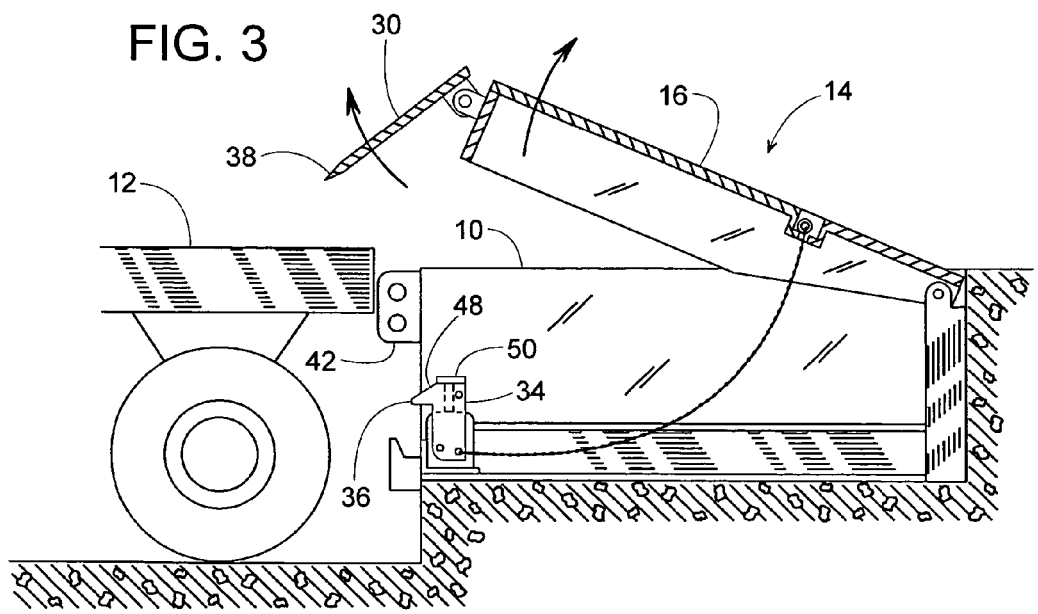

DOCK LEVELER WITH COMBINATION SAFETY LEG AND LIP DEFLECTOR

BACKGROUND OF THE INVENTION

1. Field of the Invention

The subject invention generally pertains to dock levelers and more specifically to a deck-supporting safety leg that is retractable to selectively support the dock leveler's deck at a first below-dock position or deflect the deck's pivotal lip beyond a set of lip keepers so that the deck can descend to an even lower below-dock position.

2. Description of Related Art

Dock levelers are commonly utilized to compensate for height differentials between the loading surface of a loading dock and the bed of a parked vehicle. In most instances, dock levelers are mounted within a recess or pit of the loading dock and are provided with a generally planar deck which is pivotally movable with respect to the loading surface of the loading dock. Dock levelers are also provided with a deck actuator which moves the deck between a plurality of operating positions including, for example, various raised positions wherein a front header of the deck is inclined upwardly above the loading surface of the loading dock to facilitate the loading and unloading of vehicles having high beds, a cross-traffic position wherein the deck is substantially aligned with the loading surface of the loading dock, and various below dock level positions wherein the front header of the deck is inclined downwardly beneath the loading surface of the loading dock. Below dock level positions can be for the loading and unloading of vehicles having low beds, end-load operations where cargo is added or removed from the very end of the bed, or for safety reasons such as providing the deck with an intermediate stop should a vehicle prematurely pull away from the dock while a load is still on the deck.

Basically, there are two categories of dock levelers: (1) biased-up or mechanical levelers; and (2) biased-down levelers. With biased-up levelers, one or more mechanical mechanisms, such as springs or other biasing members, are provided to bias the deck upward. Once raised, the deck must then be "walked down" to a lower position. A hold-down device, such as a ratchet and pawl arrangement, maintains the deck in this lowered position, against the biasing of the springs or other upward biasing members. With biased-down levelers, the deck is biased toward the lowered position by gravity. Thus, a powered actuator is required to raise the deck. Powered actuators may take the form of a hydraulic cylinder, an airbag, a linear actuator such as a drive screw, or the like.

In order to span a gap that may exist between the deck of the dock leveler and the rear end of a parked vehicle, typically created by existence of dock bumpers, and to provide a bridge between the loading dock and the vehicle, dock levelers are typically provided with an extension plate or lip which is hinged to the front header of the deck. In operation, the lip moves between a pendant position wherein the lip is inclined downwardly with respect to the deck and an extended position wherein the lip extends outwardly from the front header in a generally parallel manner with respect to the deck. In the extended position, the lip is adapted to rest upon and be supported by the bed of the parked vehicle and to provide a bridge between the loading dock and the vehicle.

There are a variety of mechanisms known in the art for actuating the lip of dock levelers. In hydraulic dock levelers, for example, an independent hydraulic cylinder from the one used to actuate the deck is employed to extend the lip. Alternatively, the powered up or down motion of the deck can also be used to extend the lip. In the case of using the upward motion of the deck to extend the lip, a snubbing cable is typically provided between a linkage carried on the deck and the frame for the dock leveler, as disclosed, for example, in U.S. Pat. No. 5,323,503. The linkage, in turn, is connected to the lip. When the deck is raised well above the cross-traffic position, the snubbing cable is stretched and the linkage is rotated to extend the lip. In the case of using the downward motion of the deck to extend the lip, a mechanical toggle mechanism is typically employed to extend the lip as the deck descends from the raised position by either force of gravity or by walking onto the deck, as disclosed, for example, in U.S. Pat. No. 5,475,888. For this reason, such lips are commonly referred to as "walk-out lips."

When dock levelers are not in use, the deck is normally positioned in the cross-traffic position and the lip is normally positioned in the pendant position. In order to support the lip during periods of inactivity, dock levelers are typically provided with a lip keeper that receives and retains the lip when the deck is in the cross-traffic position and the lip is in the pendant position.

Before loading or unloading a parked vehicle (e.g., truck, trailer, etc.), the deck is normally pivoted upwardly a sufficient amount so that the lip may exit the lip keeper and swing outwardly from the pendant position without contacting the rear end of the vehicle. Once the lip has cleared the vehicle and is in the extended position, the deck and the extended lip are then pivoted downwardly as a unit until the lip rests upon the bed of the parked vehicle and spans the gap between the deck of the dock leveler and the rear end of the vehicle. When the gap is bridged in this manner, lift trucks and the like can safely load and unload the vehicle of its cargo, freight, or other material.

Dock levelers are also often used without the lip extended in so-called end-load situations. When a vehicle arrives at the loading dock, the cargo therein may extend all the way to the rear edge of the vehicle. Accordingly, there is no room on the bed of the vehicle for a conventional, extended lip. Similarly, when loading a trailer to full capacity, the last loads placed on the trailer will need to be positioned where the extended lip normally would rest. For both of these end-loading situations the dock leveler needs to be used without the lip being extended, i.e., remaining in or near its pendant position. If the trailer bed is either at or above dock level, the placement or removal of such end-loads can typically be done with the deck in the cross-traffic position. The forks of a forklift can simply extend across the between the deck of the dock leveler and the rear end of the vehicle for the purpose of placing or removing the load. If the vehicle bed is above dock height, the forks can simply be raised to that level, a feature provided on most forklifts. If, however, the bed of a vehicle, on which an end-load is going to be placed or from which an end-load is going to be taken, is below dock level, the deck may be lowered to a below dock level end loading position. To do this, the deck may be moved to a below dock level position without the lip being extended. Thus, when moving the deck from the cross-traffic position (with the lip stored in the lip keepers), the deck can first be raised to allow the lip to come out of the keepers but not so high as to extend the lip. Then the pendant lip can be partially extended so that it can avoid the lip keepers as the deck is subsequently lowered toward the below dock level position. Of course, the lip preferably does not extend a substantial distance, or else it would catch on the bed or other portions of the rear end of the vehicle and interfere with lowering the deck downward. Thus, it is desirable in such a situation to have a mechanism that can extend the lip partially, so that it will miss the lip keeper as the deck moves downward.

Perhaps the best example of such a mechanism for partially extending a lip is disclosed in U.S. Pat. No. 6,085,375. For below dock end-loading, in this example, a chain actuated lip guide can be manually rotated forward to extend over the lip keepers. With the lip guide rotated forward while the deck and lip descend, the lip guide deflects the lower edge of the lip in front of the lip keepers so that the lip can avoid and travel below the lip keepers.

Another important aspect of dock levelers is their ability to safely respond to a situation where a vehicle unexpectedly departs the dock while the lip of the dock leveler is still resting on the bed of the vehicle and a load is still on the deck. To prevent the deck from freefalling in such a situation, dock levelers may include some type of hydraulic or mechanical stopping mechanism. The dock leveler of U.S. Pat. No. 3,835,497, for instance, has load sensing hydraulic cylinders that permit free movement of the deck under light loads, but positively prevent free falling when the deck is heavily loaded. Other dock levelers employ mechanical safety legs that safely limit a deck's freefall distance. Mechanical safety legs are usually pivotally retractable to permit end-loading operations. Examples of such safety legs are disclosed in U.S. Pat. Nos. 3,137,017; 3,530,488; 3,858, 264; 3,877,102; 3,921,241; 4,279,050; 4,974,276; 5,813, 072; 6,216,303; and 6,276,016.

A drawback of current dock levelers is that that they involve two different mechanisms, one for limiting freefall and another for below dock end-loading. Since freefall prevention and below dock end-loading operations are very separate and distinct situations that are seemingly unrelated, a single mechanism for effectively providing both functions has yet to be developed.

SUMMARY OF THE INVENTION

In some embodiments, a single support mechanism for a dock leveler provides two functions, (1) limiting freefall of a deck and (2) deflecting a lip to permit below dock end-loading.

In some embodiments, a safety leg for limiting freefall of a deck pivots forward toward the front of the deck to permit below dock end-loading operations.

In some embodiments, a safety leg is pivotally connected to a stationary frame rather than being pivotally connected to the deck of a dock leveler.

In some embodiments, a safety leg includes a cam surface that sliding engages the lip to deflect the lip away from a lip keeper.

In some embodiments, the sliding friction between the lip and the cam surface of the safety leg helps hold the safety leg at its lip-deflecting position.

In some embodiments, a safety leg is designed such that its pivotal joint is protected from having to support the weight of the deck.

In some embodiments, a cam surface of a safety leg engages the distal edge of a dock leveler lip to minimize the force required to deflect the lip.

In some embodiments, the movement of a lip deflector to a lip-deflecting position is what moves a safety leg, so a descending deck of a dock leveler clears the top surface of the leg.

In some embodiments, relatively light movement of a lip deflector serves as a trigger that enables a descending deck to move a safety leg.

In some embodiments, the deck of a dock leveler does not have to carry the weight of a safety leg.

In some embodiments, the deck of a dock leveler does not have to carry the weight of a lip deflector.

BRIEF DESCRIPTION OF THE DRAWINGS

FIG. 2 is a cross-sectional side view of the dock leveler of FIG. 1 but with the deck in a cross-traffic position and a safety leg in a deck-supporting position.

FIG. 3 is a cross-sectional side view of the dock leveler of FIG. 1 but with the deck in a raised elevation and the lip moving to an extended position.

FIG. 9b is an enlarged view of FIG. 9a.

FIG. 15b is an enlarged portion of the support mechanism of FIG. 15a.

FIG. 16b is an enlarged portion of the support mechanism of FIG. 16a.

FIG. 17b is an enlarged portion of the support mechanism of FIG. 17a.

DESCRIPTION OF THE PREFERRED EMBODIMENT

Figure 1:
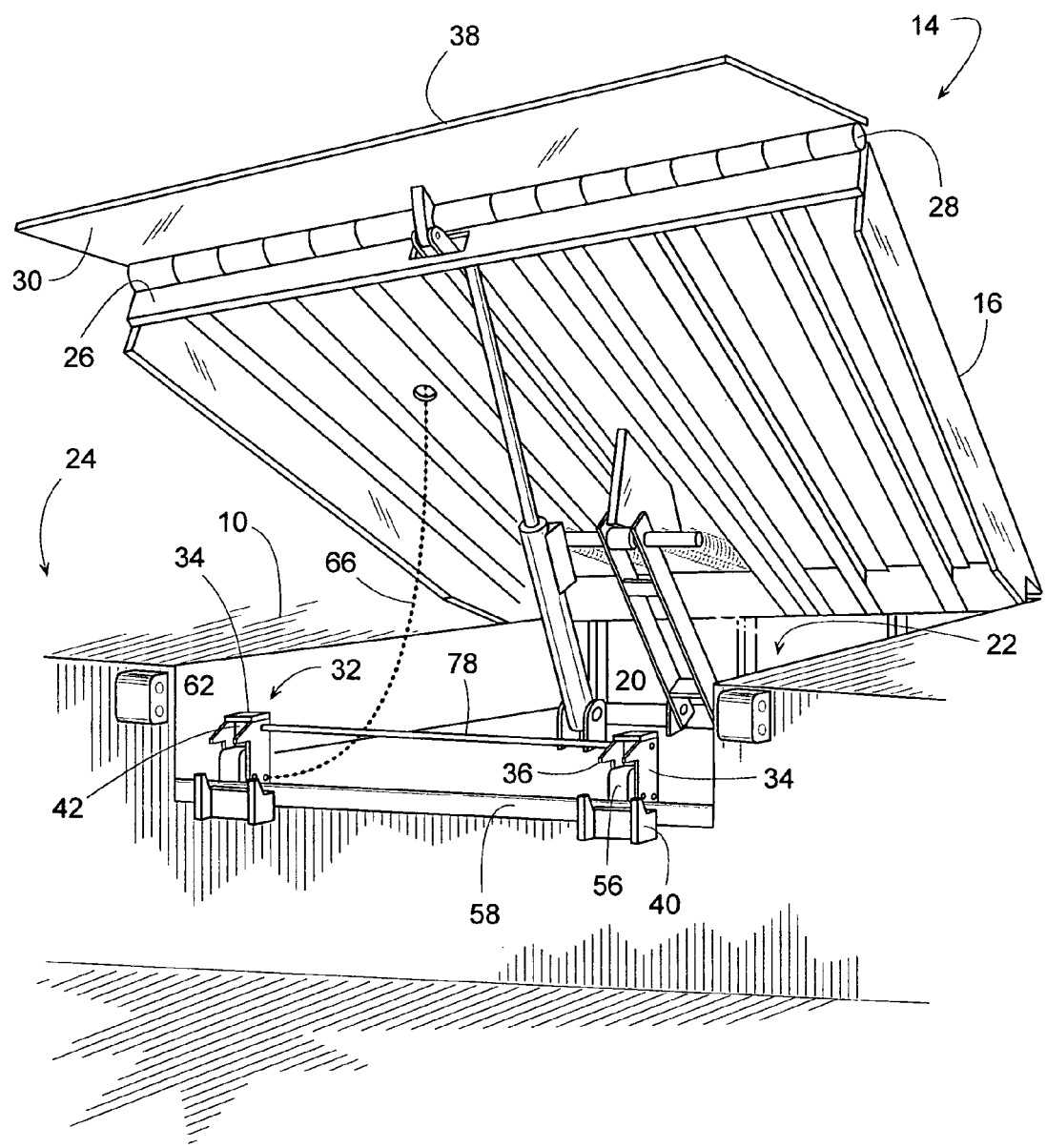
FIG. 1 is a perspective view of a dock leveler with its deck in a raised elevation to show a support mechanism that is underneath the deck.

Referring to FIGS. 1–3, in order to compensate for a height differential that may exist between a loading dock platform 10 and a truck or truck bed 12, a dock leveler 14 includes a ramp or deck 16 whose rear edge 18 is pivotally connected to a frame 20. Frame 20 broadly encompasses any individual structure or combination structures (interconnected assembly or separate items) that help mount dock leveler 14 within a pit 22 of a loading dock 24. Pivoting deck 16 raises or lowers a front distal edge 26 of deck 16 so that edge 26 generally matches the height of truck bed 12. A hinge 28 pivotally couples an extension plate or lip 30 to deck 16 so that lip 30 can swing out and rest upon the rear edge of truck bed 12, thus bridging the gap between the deck's front edge 26 and the rear of truck bed 30. Together, deck 16 and extended lip 30 provide an elevated path for a forklift truck and personnel to travel between platform 10 and truck bed 12, thus facilitating the loading and unloading of the truck's cargo (reference FIG. 5).

To permit below dock end-loading operations and to limit freefalling of deck 16, dock leveler 14 includes a unique support mechanism 32 that employs one or more safety legs 34. In some embodiments, leg 34 includes an integral lip deflector 36 and can be selectively moved to a deck-supporting position for freefall protection or moved to a lip-deflecting position for below dock end-loading operations. A description of these and other operations of dock leveler 14 along with a further description of safety legs 34 will follow.

Referring to FIG. 2, operation of dock leveler 14 typically begins with truck 12 backing into dock 24 while dock leveler 14 has its deck at a cross-traffic elevation. Deck 16 is at the cross-traffic elevation when the deck's top surface is generally flush with platform 10. Lip 30 is shown in a pendant position with a distal edge 38 of lip 30 resting upon one or more lip keepers 40, whereby lip 30 and keepers 40 help support the weight of deck 16 at its cross-traffic elevation and help support the weight of forklift trucks moving onto or across the deck. At this point of the dock leveler's operation, safety leg 34 is at its deck-supporting position. Although two safety legs 34 are used in this embodiment, using just one leg is well within the scope of the invention.

Referring to FIG. 3, the next step of the operation involves truck 12 backing up against bumpers 42, deck 16 rising, and lip 30 extending. This action prepares dock lever 14 so that deck 16 and lip 30 can be lowered upon the truck bed 12. Bumpers 42 provide a gap between the rear of truck 12 and the front of dock leveler 14 to help protect the truck, building, and dock leveler from damage and ensure that there is sufficient room behind the truck for the dock leveler to operate. Those skilled in the art will appreciate that are a myriad of known drive mechanisms for pivoting the deck and fully extending the lip of a dock leveler. Thus, such mechanisms have not been shown in many of the drawing figures so that other features can be more clearly illustrated. Examples of such deck or lip drive mechanisms include, but are not limited to, a hydraulic cylinder, pneumatic cylinder, inflatable bag, bellows, spring actuator, drive screw, linear motor, winch, manual actuation, mechanical linkage, cam actuation, and various combinations thereof.

Figure 4:
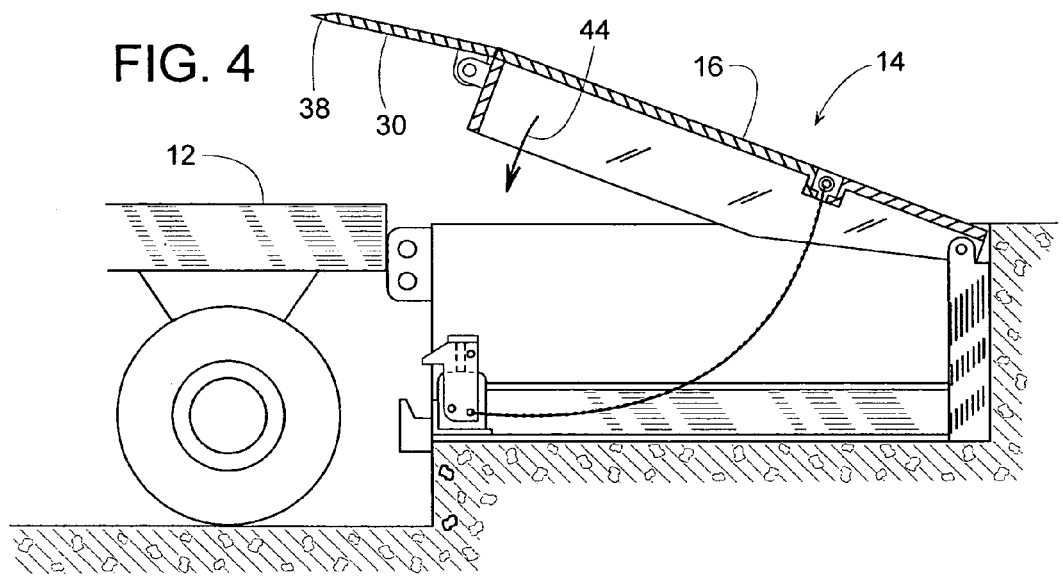
FIG. 4 is a cross-sectional side view of the dock leveler of FIG. 1 showing the lip extended and the deck descending toward the bed of a truck.

FIG. 4 shows deck 16 having moved from its cross-traffic elevation, of FIG. 2, to a raised elevation and shows lip 30 having moved from a pendant position, of FIG. 2 or 3, to an extended position. The term, "extended position" refers to the lip's distal edge 38 having been rotated to an upper limit relative to deck 16. The term, "pendant position" refers to lip 30 being anywhere other than its extended position. The term, "raised elevation" refers to deck 16 being rotated above its cross-traffic elevation. Arrow 44 of FIG. 4 represents deck 16 descending to place extended lip 30 on the deck of truck bed 12.

Figure 5:
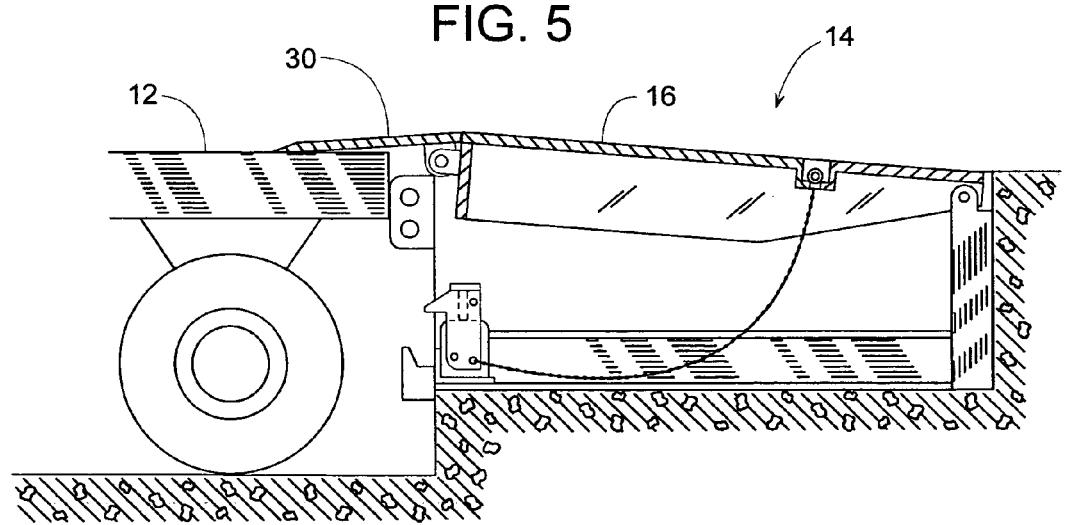
FIG. 5 is a cross-sectional side view of the dock leveler of FIG. 1 showing the dock leveler lip resting upon the truck bed.

Next, FIG. 5 shows dock leveler 14 in a position where material handling equipment and personnel can cross over between truck 12 and deck 16 for loading or unloading the truck of cargo.

Figure 6:
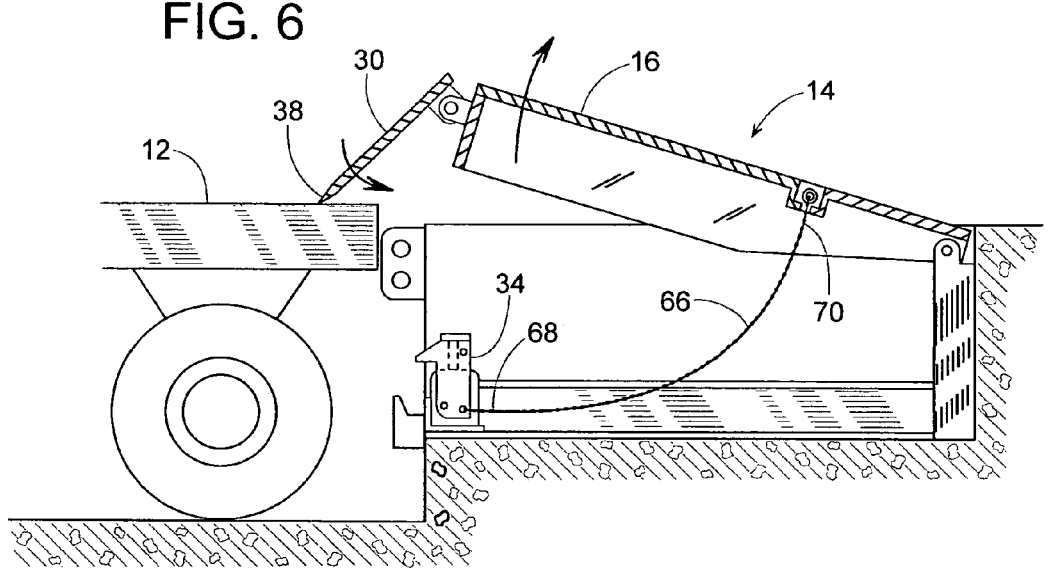
FIG. 6 is a cross-sectional side view of the dock leveler of FIG. 1 showing the deck ascending and the lip retracting.
Figure 9A:
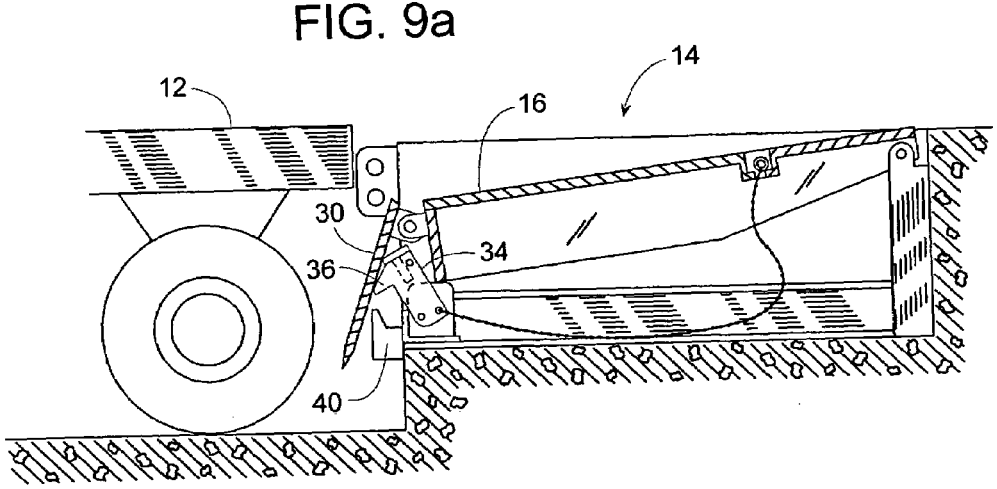
FIG. 9a is a cross-sectional side view of the dock leveler of FIG. 1 showing the deck at a below dock level end-loading elevation.

If the position of lip 30 resting on the bed of truck 12 interferes with the placement or removal of a load from the very rear of the truck bed, dock leveler 14 can be moved to an end-loading position as shown in FIG. 2 for trucks at or higher than dock level or to a below dock level position as shown in FIG. 9a for truck beds lower than dock level. Below dock end loading can be achieved by first raising deck 16 while allowing lip 30 to pivot toward a pendant position, as shown in FIG. 6. Once deck 16 removes the lip's distal edge 38 from the truck bed (reference FIG. 6), deck 16 can be lowered, as indicated by arrow 46 of FIG. 7.

Figure 7:
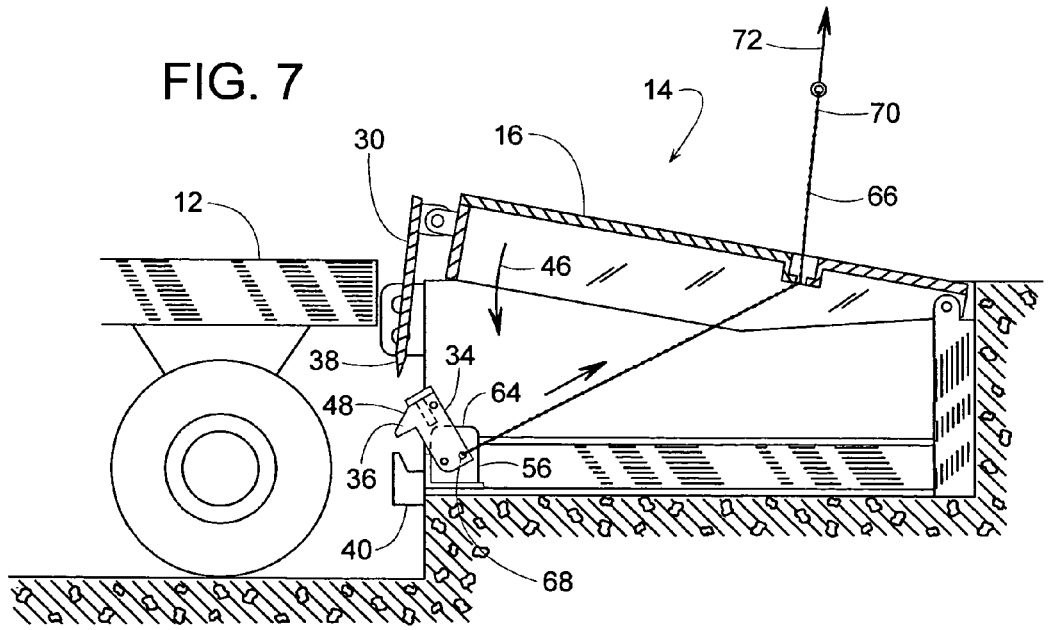
FIG. 7 is a cross-sectional side view of the dock leveler of FIG. 1 showing the deck descending and the safety leg moving toward the lip-deflecting position.
Figure 8:
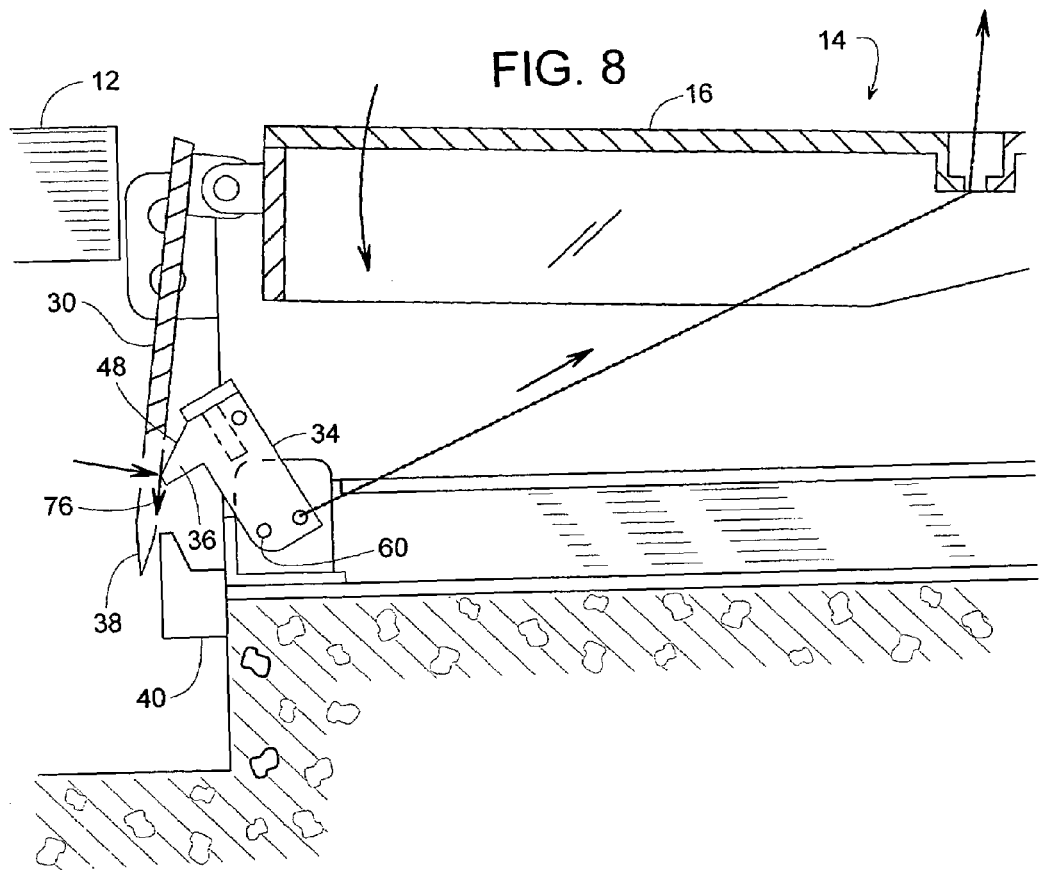
FIG. 8 is a cross-sectional side view of the dock leveler of FIG. 1 showing the lip-deflector deflecting the lip as the deck descends.

To prevent deck 16 from lowering lip 30 back into its lip keepers 40, safety leg 34 is moved from its deck-supporting position of FIGS. 1–6 to its lip-deflecting position of FIG. 7. So, as deck 16 descends, distal edge 38 of lip 30 engages and slides across a cam surface 48 of lip deflector 36, as shown in FIG. 8. Lip deflector 36 deflects distal edge 38 and guides lip 30 between lip keepers 40 and the rear of truck 12. With leg 34 at its lip-deflecting position, rather than at its deck-supporting position, deck 16 is able to descend to the below dock end-loading position of FIGS. 9a and 9b without being obstructed by an upper support surface 50 of leg 34 or lip keeper 40. With deck 16 in its below dock level end-loading position, loads can be added or removed from the very end of the truck bed, particularly if the truck bed is below dock level.

Figure 9B:
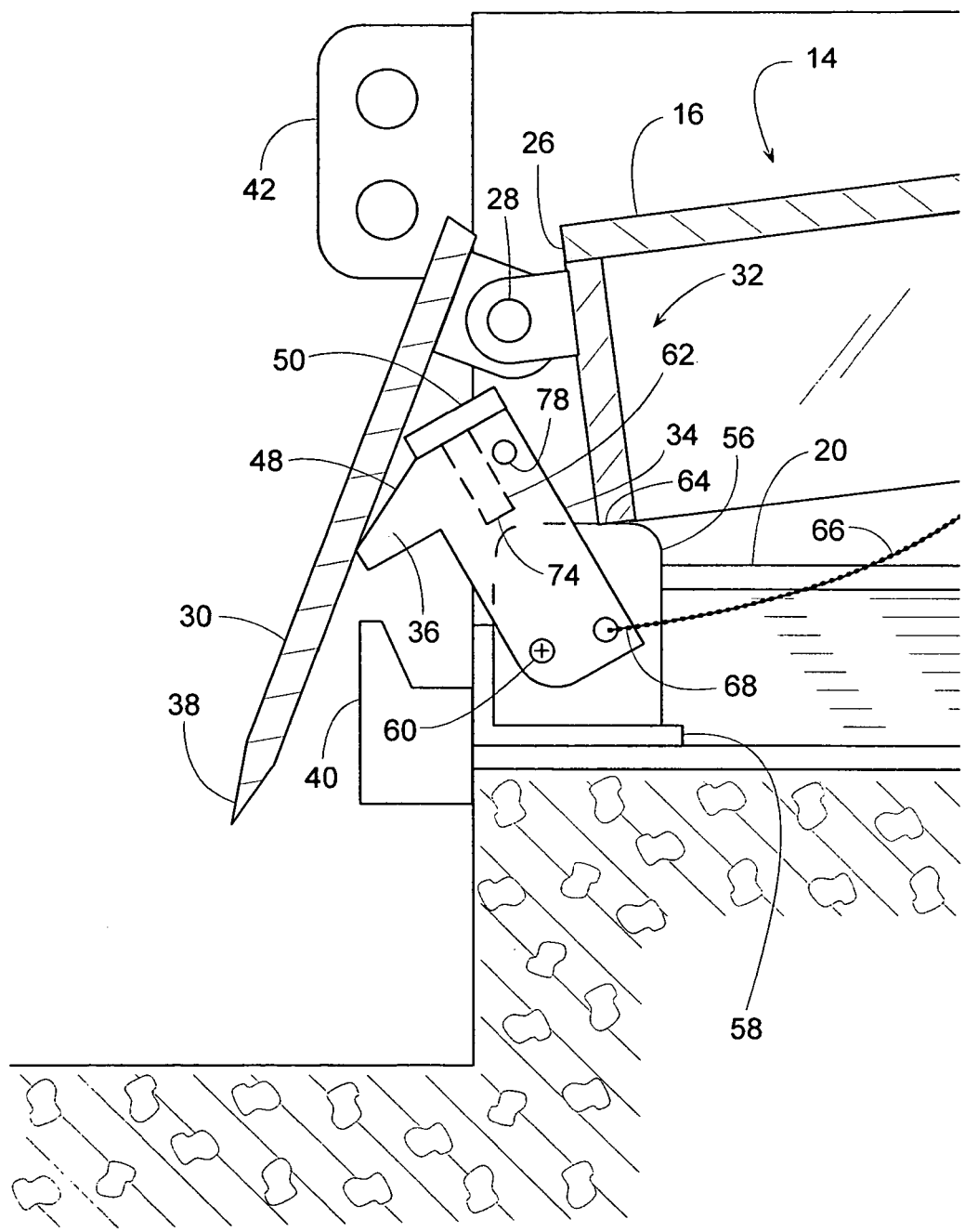
Figure 9C:
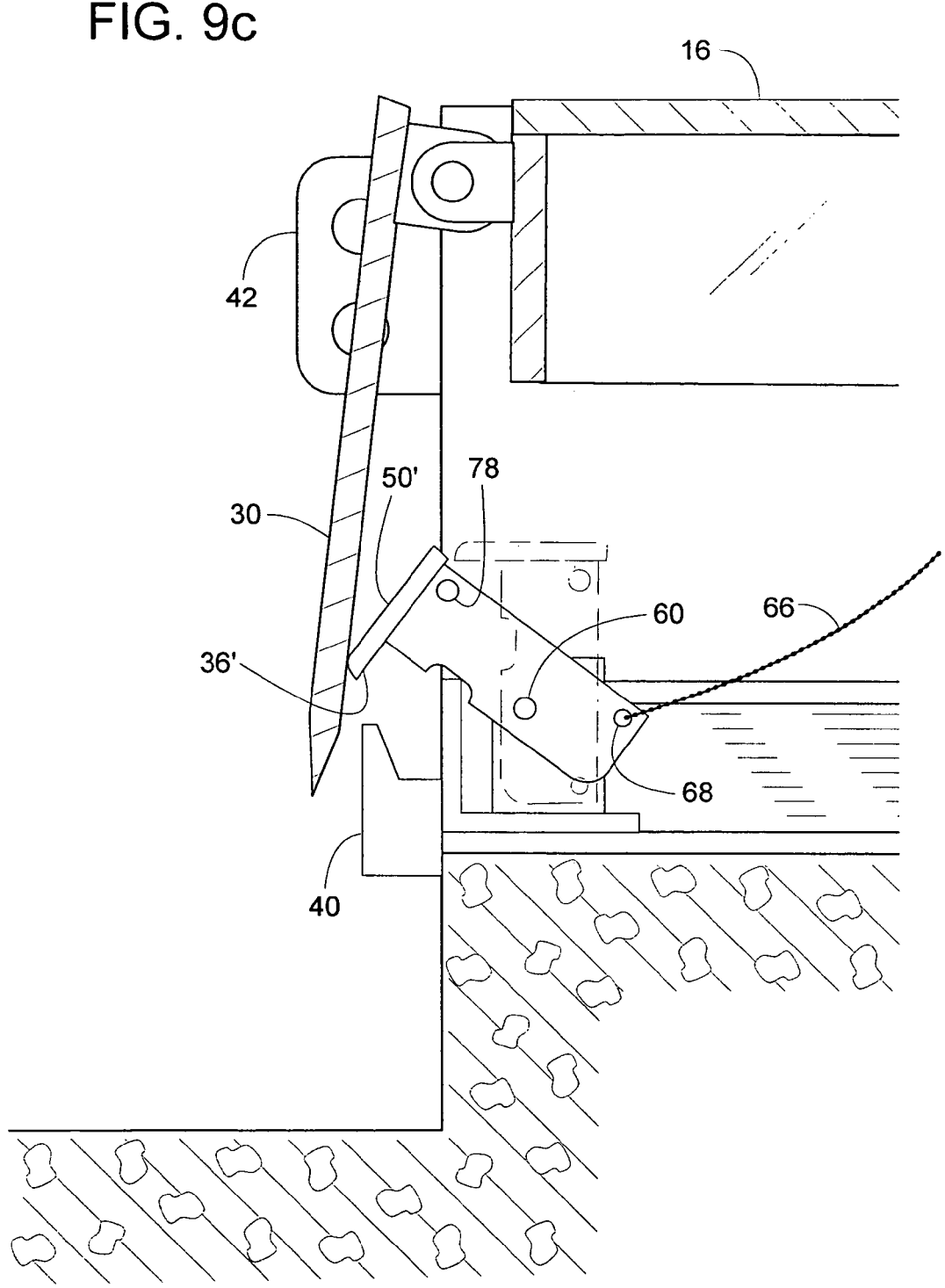
FIG. 9c is similar to FIG. 9b but showing a safety leg that includes a combination landing surface and lip deflector
Figure 10:
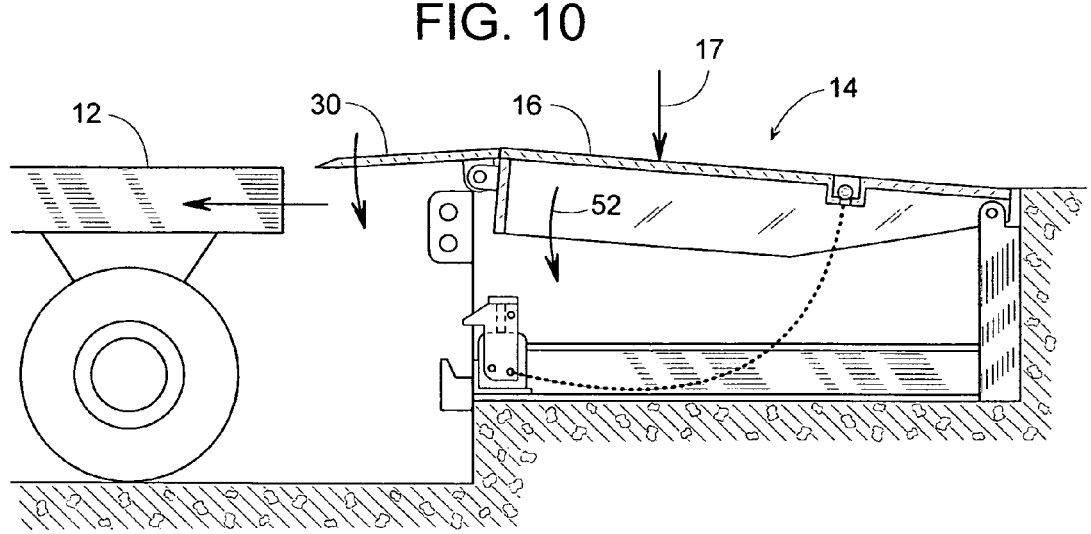
FIG. 10 shows a truck accidentally departing a loading dock, thereby creating a freefall situation of a dock leveler carrying a load.
Figure 11:
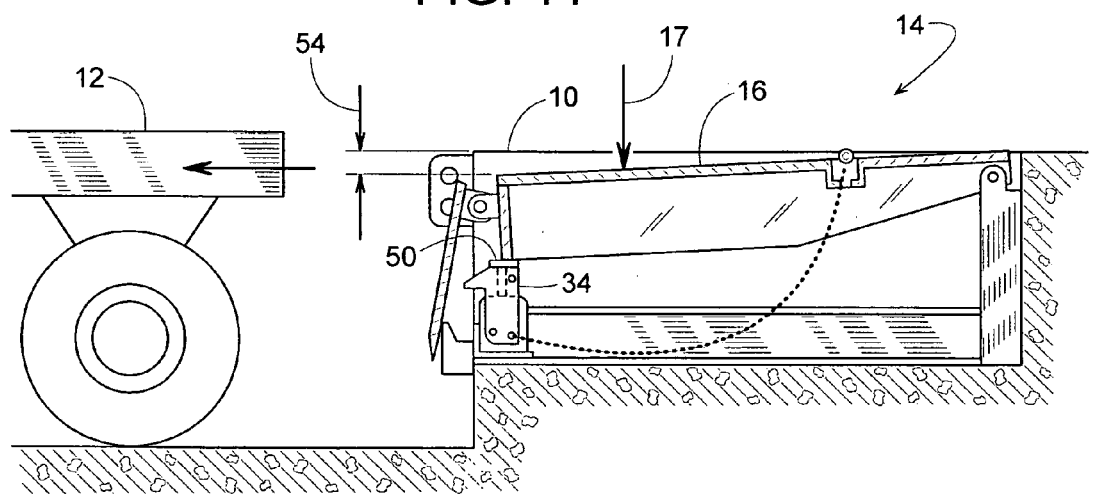
FIG. 11 is a cross-sectional side view of the dock leveler of FIG. 10 showing the deck having fallen to a safety stop elevation.

When dock leveler 14 is set up for normal loading and unloading operations, as shown in FIG. 5, truck 12 could perhaps accidentally pull away from the dock if proper safety precautions were neglected. If this were to happen while a load 17 (crate, forklift, etc.) is still on the deck, as shown in FIG. 10, lip 30 and deck 16 would lose the support of the truck bed, and the deck under the weight of load 17 might begin to freefall as indicated by arrow 52. Referring to FIG. 11, to limit the deck's fall to a predetermined safe distance 54, leg 34 is kept at its deck-supporting position so that deck 16 lands on surface 50 of leg 34 rather than dropping all the way down to the deck's below dock end-loading position of FIGS. 9a and 9b (see also similar embodiment of FIG. 9c).

The structural details of safety leg 34 may vary and yet still achieve both freefall protection and below dock level loading operation; for example, like that shown in FIG. 9c where landing surface 50' and lip deflector 36' are combined. To accomplish both freefall protection and below dock level loading operation within a single mechanism, in some embodiments (FIG. 9b), support mechanism 32 includes one or more pedestals 56 attached to a structural angle 58 of frame 20. A pin 60 pivotally connects safety leg 34 to pedestal 56 so that leg 34 can pivot between its deck-supporting position of FIG. 11 and its lip-deflecting position of FIG. 9b. In this example, an upper edge of angle 58 stops leg 34 at its lip-deflecting position, and a rib 62 of leg 34 stops leg 34 at its deck-supporting position.

When deck 16 is resting upon or strikes surface 50 of leg 34, rib 62 transmits the deck's weight or force of impact onto pedestal 56, which in turn delivers the force to frame 20, which in turn is supported by the pit floor. To avoid overloading pin 60, a horizontal offset distance between pin 60 and rib 62 helps ensure that most of the downwardly transmitted force bypasses pin 60. Although rib 62 transmits the downward force to frame 20 indirectly through pedestal 56, it is within the scope of the invention to have safety leg 34 direct the force directly into frame 20 without using rib 62 or pedestal 56.

Rib 62 and pedestal 56, nonetheless, provide some advantages. When leg 34 is at its lip-deflecting position, as shown in FIG. 9b, an upper surface 64 of pedestal 56 helps support deck 16 at its below dock level end-loading elevation. Rib 62 and pedestal 56 also allow the use of a relatively lightweight safety leg because the force of the deck pushing down against leg 34 only needs to be transmitted a short distance from the underside of deck 16 to the top surface 64 of pedestal 56. A lighter safety leg is generally easier to move between its deck-supporting and lip-deflecting positions.

The movement of leg 34 could be carried out in any number of ways. A spring, mechanical actuator, or even just the weight of the leg itself could be used to urge the leg toward its deck-supporting position. Moving the leg toward its lip-deflecting position, in some embodiments of the invention, a pliable elongate member (e.g., chain, cable, wire, strap, rope, cord, etc.) can be manually pulled to tilt leg 34 forward. A chain 66, for example, can have one end 68 (FIGS. 6 and 7) connected to a lower point of leg 34 and an opposite end 70 fed through a hole in deck 16. A dockworker could then manually shift leg 34 to its lip-deflecting position by simply pulling (reference arrow 72) on the end of the chain that extends up through the top surface of deck 16.

Referring to FIG. 9b, in tilting leg 34 from its deck-supporting position to its lip-deflecting position, rib 62 travels along a curved path that moves a lower edge 74 of rib 62 up and away from upper surface 64 of pedestal 56. This ensures smooth movement of leg 34 without lower edge 74 of rib 62 dragging or catching on upper surface 64 of pedestal 56.

Once leg 34 is at its lip-deflecting position, leg 34 is held there by a frictional force 76 generated between lip 30 and lip deflector 36. As illustrated in FIG. 8, friction 76 generates a counterclockwise force acting on safety leg 34 to maintain the leg at its lip-deflecting position during downward movement of deck 16.

In cases where support mechanism 32 includes two safety legs 34, a connecting rod 78 can connect the two legs so that they move in unison.

To reduce the pulling force required of chain 66 to move a support mechanism to its lip-deflecting position, a dock leveler 80 includes an alternate support mechanism 82, as shown in FIGS. 12–18. Support mechanism 82 comprises a safety leg 84 and a lip deflector 86 that at times move independently of each other. At other times, leg 84 and lip deflector 86 move in unison, wherein the movement of lip deflector 86 is what drives the movement of leg 84. Safety leg 84 pivots about a first pin 88 (FIG. 16b), and lip deflector 86 pivots about a second pin 90.

Figure 12:
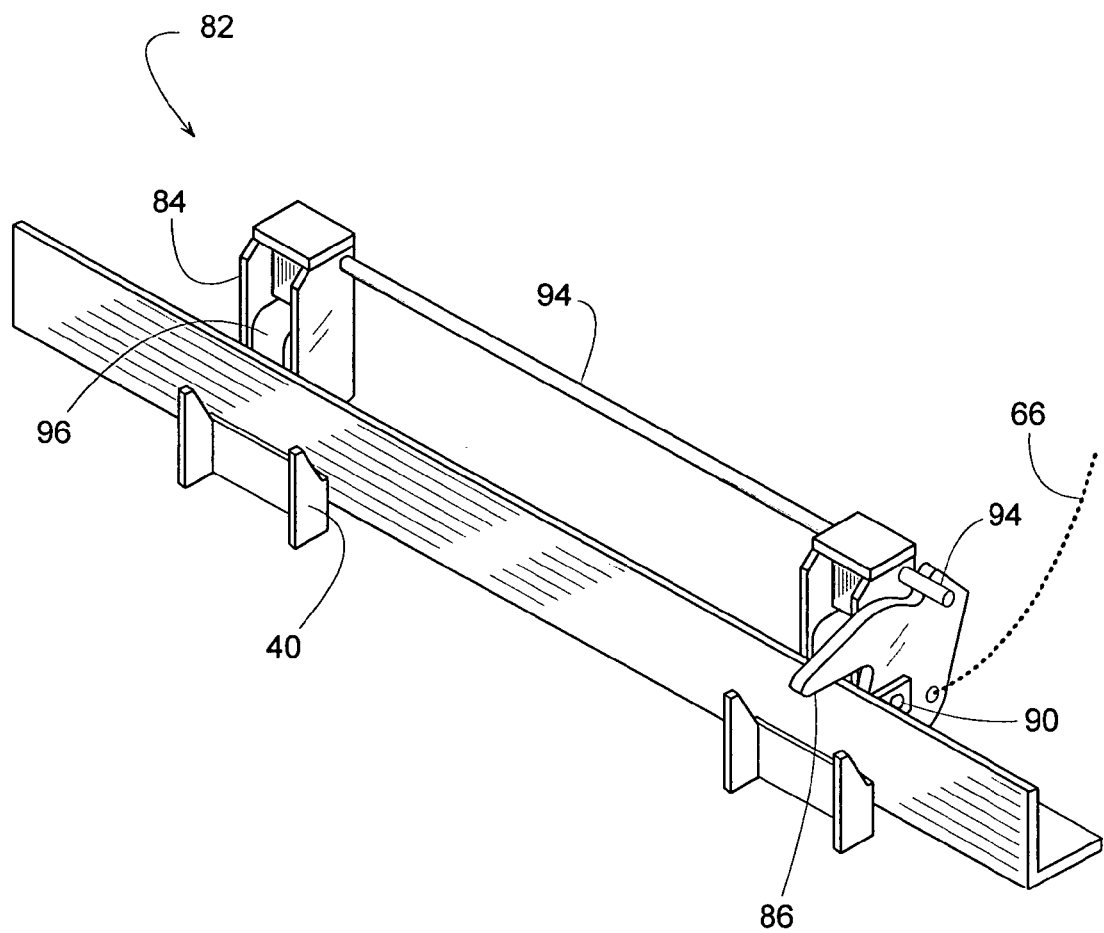
FIG. 12 is a perspective view of another support mechanism for a dock leveler.
Figure 13:
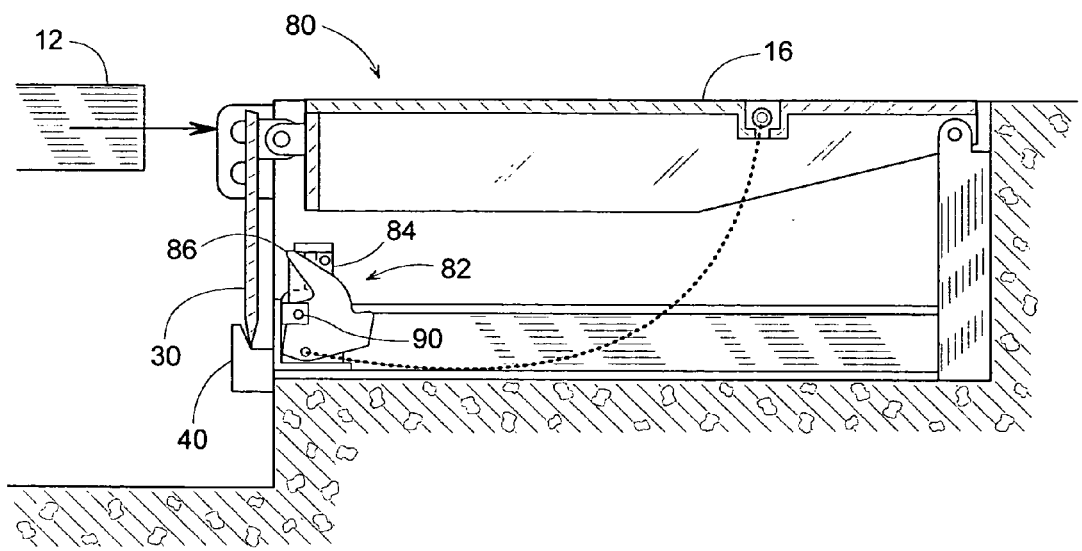
FIG. 13 is similar to FIG. 2 but showing a dock leveler that employs the support mechanism of FIG. 12.
Figure 14:
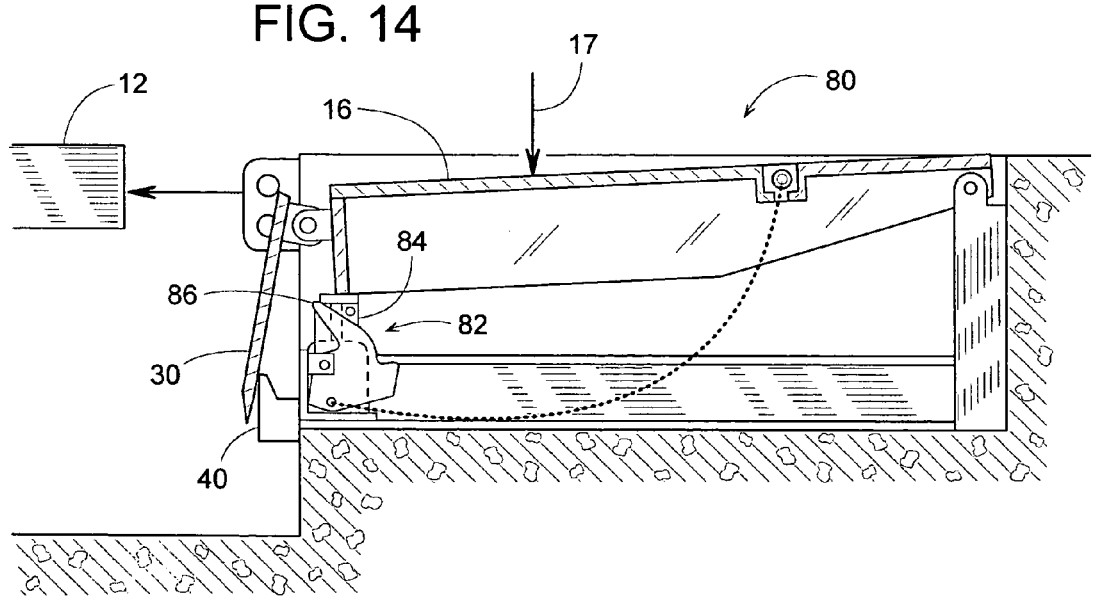
FIG. 14 is similar to FIG. 11a but showing the dock leveler of FIG. 13.
Figure 18:
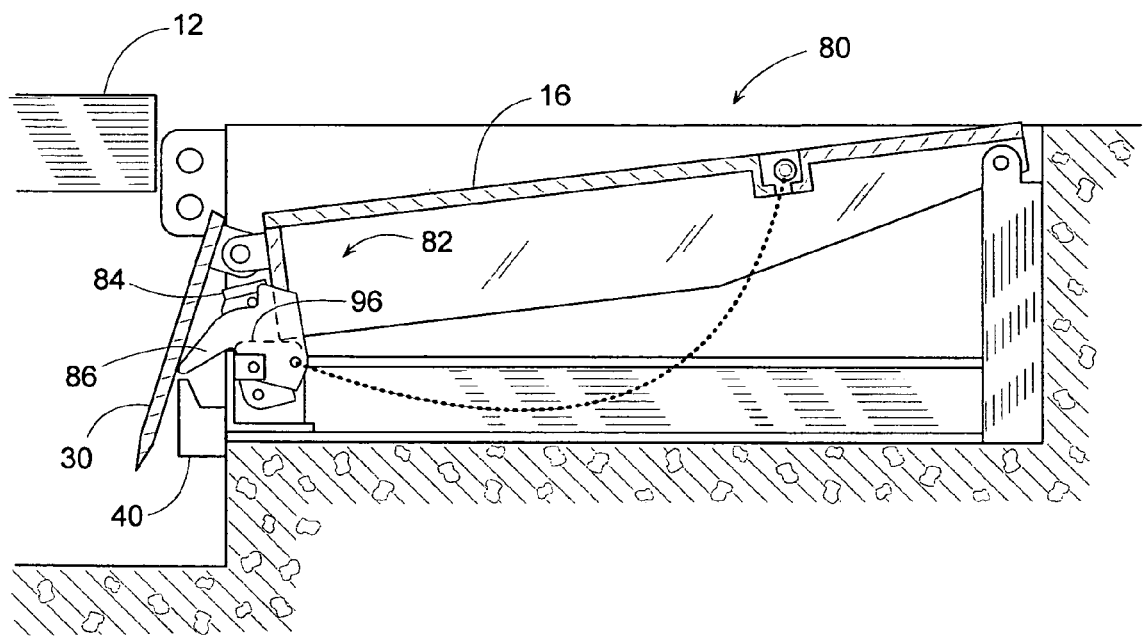
FIG. 18 is a cross-sectional side view of the dock leveler of FIG. 13 but showing the deck at its below dock level end-loading elevation.

In FIG. 12, much of dock leveler 80 is omitted to more clearly show support mechanism 82. FIG. 13 shows deck 16 at its cross-traffic elevation with leg 84 at its deck-supporting position and lip deflector 86 at a stored position. FIG. 14 corresponds to FIG. 11 where deck 16 is at its safety elevation, safety leg 84 is at its deck-supporting position, and lip deflector 86 is at its stored position. FIGS. 15a–18 show a sequence of dock leveler 80 moving deck 16 from a raised elevation (FIG. 15a) to a below dock level end-loading elevation (FIG. 18—which corresponds to FIG. 9a).

Figure 15A:
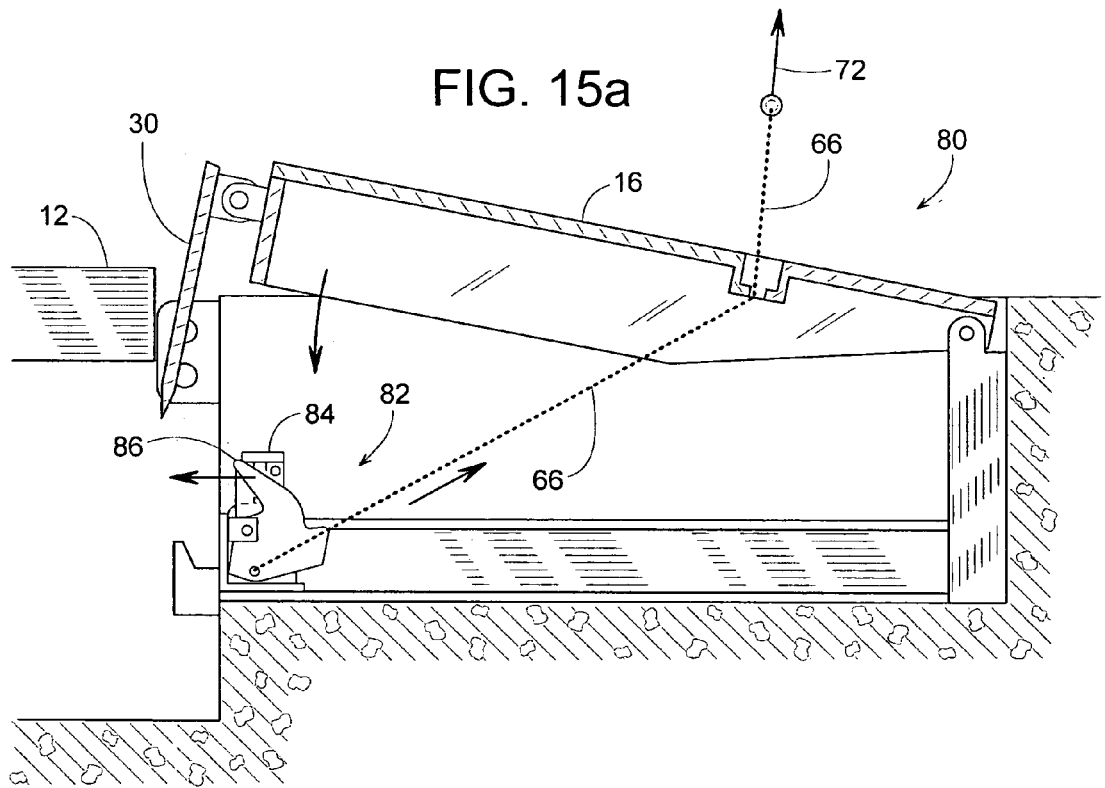
FIG. 15a is a cross-sectional side view of the dock leveler of FIG. 13 but showing the deck descending while the safety leg is at its deck-supporting position and the lip deflector about to be moved from its stored position.
Figure 15B:
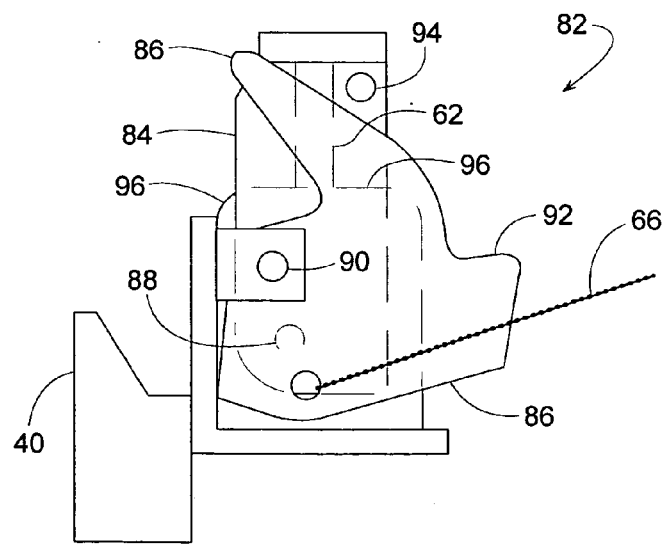
Figure 16A:
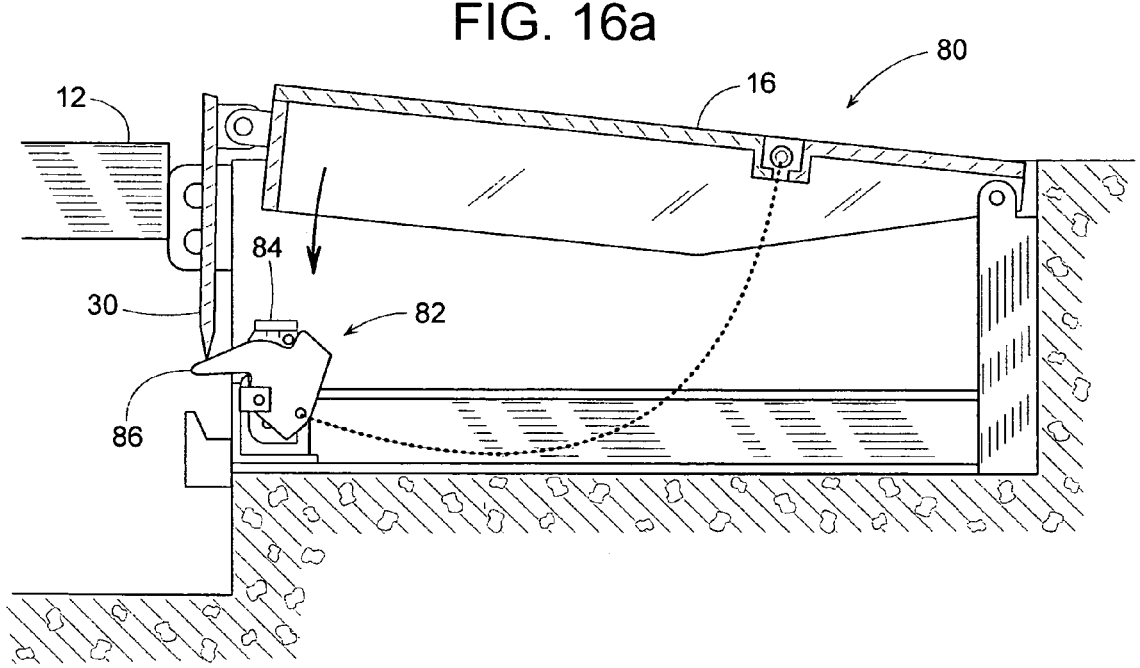
FIG. 16a is a cross-sectional side view of the dock leveler of FIG. 13 but showing the deck descending while the lip deflector is at an intermediate lip-deflecting position.
Figure 16B:
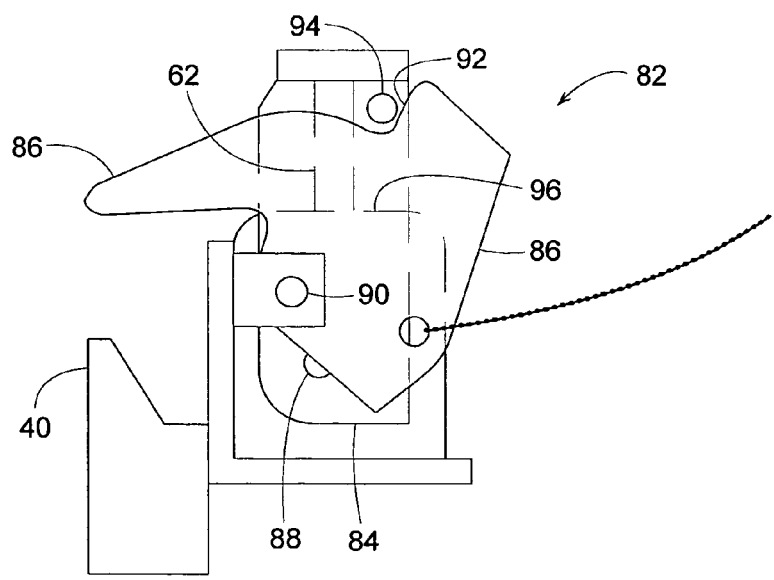
Figure 17A:
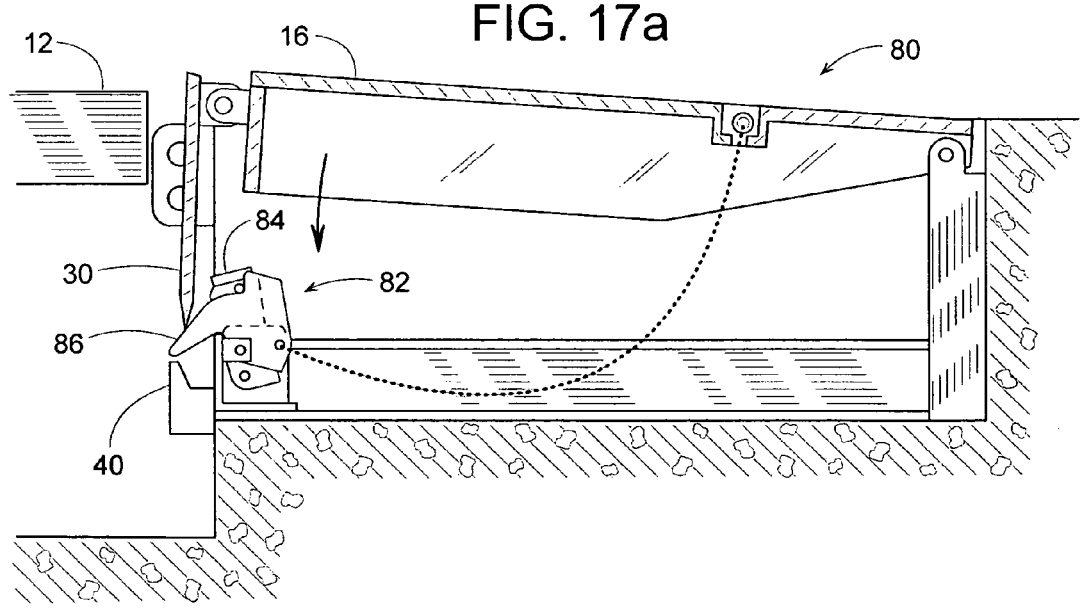
FIG. 17a is a cross-sectional side view of the dock leveler of FIG. 13 but showing the deck descending while the safety leg is at its offset position, and the lip deflector is at its lip-deflecting position.
Figure 17B:
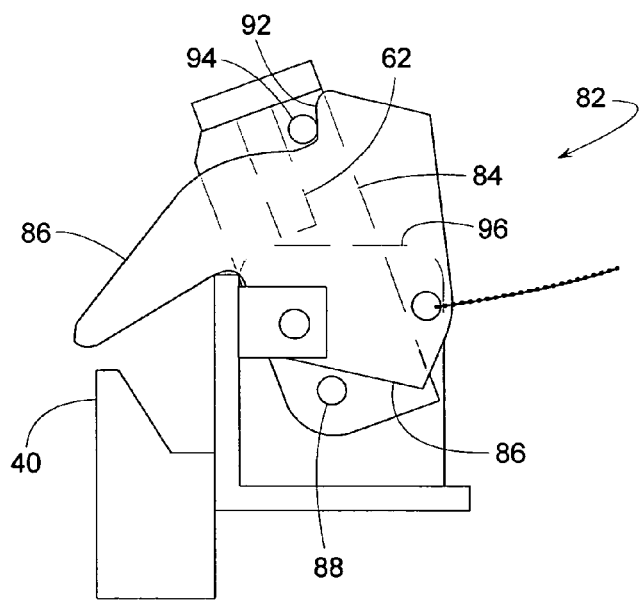

In the operational step shown in FIGS. 15a and 15b, chain 66 is manually pulled (arrow 72) to move lip deflector 86 from its stored position (FIGS. 15a and 15b) to an intermediate lip-deflecting position (FIGS. 16a and 16b). At this stage of the operation, safety leg 84 remains at its deck-supporting position. However, as deck 16 descends from its position of FIG. 16a toward that of FIG. 18, lip 30 engages lip deflector 86. As deck 16 continues to descend, lip 30 pushes lip deflector 86 completely over to its lip-deflecting position of FIGS. 17a and 17b, and lip deflector 86 deflects lip 30 so that the lip bypasses one or more lip keepers 40. As the descending lip 30 forces lip deflector 86 to pivot from its position of FIGS. 16a and 16b to that of FIGS. 17a and 17b, engagement between a lug 92 extending from lip deflector 86 and a connecting rod 94 attached to safety leg 84 causes leg 84 to pivot from its deck-supporting position of FIG. 15b to an offset position of FIG. 17b. The engagement of lug 92 and connecting rod 94 is just one of many possible examples of how a safety leg and a lip deflector can be operatively connected. The term, "operatively connected" refers to a connection of two elements where the movement of one element causes movement of the other. Safety leg 84 at its offset position and lip deflector 86 at its lip-deflecting position allows deck 16 to descend upon one or more pedestals 96 where deck 16 comes to rest at its below dock end-loading position of FIG. 18.

After completing below dock end-loading, dock leveler 80 can be returned to its cross-traffic position by raising deck 16. As deck 16 rises, friction between lip 30 and lip deflector 86 and/or the off-centered weight of lip deflector 86 rotates lip deflector 86 back to its stored position. At about the same time, safety leg 84 can return to its deck-supporting position by means described earlier with respect to safety leg 34.

The advantage of support mechanism 82 is that only the deflector needs to be moved initially, so less manual force is needed to start pivoting lip deflector 86 toward its lip-deflecting position. Once lip deflector 86 is at its intermediate position of FIG. 16b, further movement of lip deflector 86 and safety leg 84 to enable below dock end-loading is driven by the downward movement of deck 16.

Although the invention is described with reference to a preferred embodiment, it should be appreciated by those of ordinary skill in the art that various modifications are well within the scope of the invention. Therefore, the scope of the invention is to be determined by reference to the following claims:

The invention claimed is:

1. A support mechanism for a dock leveler that includes a lip pivotally attached to a deck, wherein the lip is selectively pivotal between an extended position and a pendant position, and the deck is selectively pivotal to a raised elevation, a cross-traffic elevation, a safety elevation, and a below dock level end-loading elevation, wherein the safety elevation is higher than the below dock level end-loading elevation and lower than the cross-traffic elevation, and the raised elevation is higher than the cross-traffic elevation, the support mechanism comprising:
 a deck-supporting portion; and
 a lip-deflecting portion, wherein the support mechanism is selectively movable between at least one deck-supporting position and at least one lip-deflecting position such that when the support mechanism is at the at least one deck-supporting position and the deck is at the safety elevation, the deck-supporting portion of the support mechanism is able to help support the deck, and when the support mechanism is at the at least one lip-deflecting position and the lip is in the pendant position, the lip-deflecting portion of the support mechanism is able to engage and deflect the lip in response to the deck moving downward from the raised elevation toward the below dock level end-loading elevation; wherein the deck-supporting portion of the support mechanism and the lip-deflecting portion of the support mechanism are integrally formed as a safety leg.

2. The support mechanism of claim 1, wherein the safety leg includes a cam surface adapted to slidingly engage the lip as the deck moves downward while the support mechanism is in the at least one lip-deflecting position.

3. The support mechanism of claim 1, wherein downward movement of the deck can create a frictional force against the safety leg to help hold the support mechanism at the at least one lip-deflecting position.

4. The support mechanism of claim 1, wherein the deck pushing down against the safety leg helps hold the support mechanism at the at least one deck-supporting position.

5. The support mechanism of claim 1, wherein the support mechanism includes a pivotal joint that enables the support mechanism to move between the at least one deck-supporting position and the at least one lip-deflecting position, wherein the deck is able to exert a downward force against the safety leg such that most of the downward force bypasses the pivotal joint.

6. The support mechanism of claim 1, further comprising a biasing element coupled to the support mechanism to urge the support mechanism to the at least one deck-supporting position.

7. The support mechanism of claim 1, further comprising a pliable elongate member connected to the safety leg such that tension in the pliable elongate member urges the support mechanism toward the at least one lip-deflecting position.

8. A dock leveler comprising:
a deck having a rear edge and a forward edge and being pivotal to selectively raise and lower the front edge to a raised elevation, a cross-traffic elevation, a safety elevation, and a below dock level end-loading elevation, wherein the safety elevation is higher than the below dock level end-loading elevation and lower than the cross-traffic elevation, and the raised elevation is higher than the cross-traffic elevation;
a lip coupled to the forward edge of the deck and being selectively pivotal between an extended position and a pendant position relative to the deck; and
a support mechanism comprising:
a deck-supporting portion; and
a lip-deflecting portion, wherein
the support mechanism is selectively movable between a deck-supporting position and a lip-deflecting position such that when the support mechanism is at the deck-supporting position and the front edge of the deck is at the safety elevation, the deck-supporting portion of the support mechanism helps support the deck, and when the support mechanism is at the lip-deflecting position and the lip is in the pendant position, the lip-deflecting portion of the support mechanism engages the lip in response to the front edge of the deck moving downward from the raised elevation toward the below dock level end-loading elevation; wherein the deck-supporting portion of the support mechanism and the lip-deflection portion of the support mechanism are integrally formed as a safety leg.

9. The dock leveler of claim 8, wherein the safety leg pivots toward the rear edge of the deck as the support mechanism moves toward the deck-supporting position.

10. The dock leveler of claim 8, wherein the lip includes a distal edge that engages the safety leg when the support mechanism is at the lip-deflecting position and the lip is in the pendant position while the deck is moving downward from the raised elevation toward the below dock level end-loading elevation.

11. The dock leveler of claim 8, wherein the lip slides along the safety leg when the support mechanism is at the lip-deflecting position and the lip is in the pendant position while the deck is moving downward from the raised elevation toward the below dock level end-loading elevation.

12. The dock leveler of claim 8, wherein a sliding frictional force between the lip and the safety leg helps hold the support mechanism at the lip-deflecting position as the deck moves downward from the raised elevation toward the below dock level end-loading elevation while the lip is in the pendant position.

13. The dock leveler of claim 8, wherein the deck pushing down against the safety leg helps hold the support mechanism at the deck-supporting position.

14. The dock leveler of claim 8, wherein the safety leg includes a pivotal joint that enables the support mechanism to move between the deck-supporting position and the lip-deflecting position, wherein the deck in the safety elevation exerts a downward force against the safety leg such that most of the downward force bypasses the pivotal joint.

15. The dock leveler of claim 8, further comprising a biasing element coupled to the safety leg to urge the support mechanism to the deck-supporting position.

16. The dock leveler of claim 8, further comprising a lip keeper that engages the lip and helps support the weight of the deck when the lip is at the pendant position and the deck is at the cross-traffic position, wherein the support mechanism in the lip-deflecting position deflects the lip toward the extended position to guide the lip past the lip keeper as the deck lowers the front edge from the raised elevation toward the below deck level end-loading elevation.

17. The dock leveler of claim 8, further comprising a pliable elongate member connected to the safety leg such that tension in the pliable elongate member urges the support mechanism toward the lip-deflecting position.

18. A support mechanism for a dock leveler that includes a lip pivotally attached to a deck, wherein the lip is selectively pivotal between an extended position and a pendant position, and the deck is selectively pivotal to a raised elevation, a cross-traffic elevation, a safety elevation, and a below dock level end-loading elevation, wherein the safety elevation is higher than the below dock level end-loading elevation and lower than the cross-traffic elevation, and the raised elevation is higher than the cross-traffic elevation, the support mechanism comprising:
a deck-supporting; and
a lip-deflecting portion,
wherein the support mechanism is a selectively movable between a deck-supporting position and an offset position such that when the support mechanism is at the deck-supporting position the deck-supporting portion of the support mechanism is able to support the deck at the safety elevation, and when the support mechanism is at the offset position, the deck is permitted to descend below the safety elevation; and wherein the support mechanism is selectively movable between a lip-deflecting position and a stored position, such that when the support mechanism is at the lip-deflecting position, the lip-deflecting portion is able to engage and deflect the lip in response to the deck moving downward from the raised elevation toward the below dock level end-loading elevation, and when the lip-deflecting portion is at the stored position, the deck is able to move from the raised position to the cross-traffic position while the lip is pendant and substantially unobstructed by the lip-deflecting portion, wherein the lip-deflecting portion and the deck-supporting portion are operatively interconnected such that movement of the lip-deflecting portion causes movement of the deck-supporting portion.

19. The support mechanism of claim 18, wherein the deck-supporting portion of the support mechanism is formed by a safety leg, and wherein the lip-deflecting portion of the support mechanism is formed by a lip deflector operatively coupled to the safety leg.

20. The support mechanism of claim 19, wherein the lip deflector moves away from the stored position in response to the deck descending toward the below dock level end-loading elevation.

21. The support mechanism of claim 19, wherein the safety leg and the lip deflector can move independently of each other.

22. The support mechanism of claim 19, wherein the safety leg is moved toward the offset position by the lip deflector moving away from the stored position.

23. The support mechanism of claim 19, wherein the lip deflector includes a cam surface that is adapted to slidingly engage the lip as the deck moves downward while the lip deflector is in the lip-deflecting position.

24. The support mechanism of claim 19, wherein downward movement of the deck can create a frictional force against the lip deflector that helps hold the lip deflector at the lip-deflecting position.

25. A dock leveler comprising:
a deck having a rear edge and a forward edge and being pivotal to selectively raise and lower the front edge to a raised elevation, a cross-traffic elevation, a safety elevation, and a below dock level end-loading elevation, wherein the safety elevation is higher than the below dock level end-loading elevation and lower than the cross-traffic elevation, and the raised elevation is higher than the cross-traffic elevation;
a lip coupled to the forward edge of the deck and being selectively pivotal between an extended position and a pendant position relative to the deck; and
a support mechanism comprising:
a deck-supporting portion; and
a lip-deflecting portion, wherein the support mechanism is selectively movable between a deck-supporting position and an offset position such that when the support mechanism is at the deck-supporting position, the deck-supporting portion can support the deck at the safety elevation, and when the support mechanism is at the offset position, the deck can descend below the safety elevation; and wherein the support mechanism is selectively movable between a lip-deflecting position and a stored position, such that when the support mechanism is at the lip-deflecting position, the lip-deflecting portion is able to engage and deflect the lip in response to the deck moving downward from the raised elevation toward the below dock level end-loading elevation, and when the support mechanism is at the stored position, the deck is able to move from the raised position to the cross-traffic position while the lip is pendant and substantially unobstructed by the lip-deflecting portion, wherein the lip-deflecting portion and the deck-supporting portion are operatively interconnected such that movement of the lip-deflecting portion causes movement of the deck-supporting portion.

26. The dock leveler of claim 25, wherein the deck-supporting portion of the support mechanism is formed by a safety leg, and wherein the lip-deflecting portion of the support mechanism is formed by a lip deflector operatively coupled to the safety leg.

27. The dock leveler of claim 26, wherein the safety leg pivots toward the rear edge of the deck as the safety leg moves toward the deck-supporting position.

28. The dock leveler of claim 26, wherein the lip includes a distal edge that engages the lip deflector when the lip deflector is at the lip-deflecting position and the lip is in the pendant position while the deck is moving downward from the raised elevation toward the below dock level end-loading elevation.

29. The dock leveler of claim 26, wherein the lip slides along the lip deflector when the lip deflector is at the lip-deflecting position and the lip is in the pendant position while the deck is moving downward from the raised elevation toward the below dock level end-loading elevation.

30. The dock leveler of claim 26, wherein the lip deflector moves away from the stored position in response to the deck descending toward the below dock level end-loading elevation.

31. The dock leveler of claim 26, wherein the safety leg and the lip deflector can move independently of each other.

32. The dock leveler of claim 26, wherein the safety leg is moved toward the offset position by the lip deflector moving away from the stored position.

33. The dock leveler of claim 26, wherein downward movement of the deck creates a frictional force against the lip deflector that helps hold the lip deflector at the lip-deflecting position.

* * * * *